United States Patent
Fujishiro et al.

(10) Patent No.: US 11,743,818 B2
(45) Date of Patent: Aug. 29, 2023

(54) USER TERMINAL, COMMUNICATION CONTROL APPARATUS, AND PROCESSOR

(71) Applicant: KYOCERA Corporation, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 255 days.

(21) Appl. No.: 16/591,486

(22) Filed: Oct. 2, 2019

(65) Prior Publication Data

US 2020/0037241 A1 Jan. 30, 2020

Related U.S. Application Data

(63) Continuation of application No. 14/915,089, filed as application No. PCT/JP2014/072256 on Aug. 26, 2014, now Pat. No. 10,455,500.

(30) Foreign Application Priority Data

Aug. 30, 2013 (JP) ................................. 2013-179432

(51) Int. Cl.
*H04W 52/02* (2009.01)
*H04W 52/38* (2009.01)
(Continued)

(52) U.S. Cl.
CPC ....... *H04W 52/0212* (2013.01); *H04L 5/0091* (2013.01); *H04W 52/34* (2013.01);
(Continued)

(58) Field of Classification Search
CPC ......... H04W 52/0212; H04W 72/1215; H04W 52/34; H04W 52/38; H04W 52/146; H04L 5/0091
(Continued)

(56) References Cited

U.S. PATENT DOCUMENTS

| 7,962,161 | B1 | 6/2011 | Giallorenzi et al. |
| 10,455,500 | B2 * | 10/2019 | Fujishiro ............... H04L 5/0091 |
| 2003/0045333 | A1 | 3/2003 | Kimata et al. |
| 2004/0235510 | A1 | 11/2004 | Elicegui et al. |

(Continued)

FOREIGN PATENT DOCUMENTS

| EP | 2763471 A1 | 8/2014 |
| JP | 5964792 B2 | 8/2016 |

(Continued)

OTHER PUBLICATIONS

International Search Report issued in PCT/JP2014/072256; dated Oct. 7, 2014.

(Continued)

*Primary Examiner* — Chandrahas B Patel
(74) *Attorney, Agent, or Firm* — Studebaker & Brackett PC

(57) ABSTRACT

In a user equipment, base station and method for a mobile communication system, the user equipment receives, from a first base station, transmission power control information used for a dual simultaneous transmission in which radio signals are simultaneously transmitted to both the first base station and a second base station, and determines a first transmission power and a second transmission power for the dual simultaneous transmission based on the transmission power control information. The first transmission power is used for transmitting a radio signal to the first base station, and the second transmission power is used for transmitting a radio signal to the second base station.

3 Claims, 14 Drawing Sheets

(51) Int. Cl.
*H04W 52/34* (2009.01)
*H04L 5/00* (2006.01)
*H04W 72/12* (2023.01)
*H04W 52/14* (2009.01)
*H04W 88/12* (2009.01)

(52) U.S. Cl.
CPC ....... *H04W 52/38* (2013.01); *H04W 72/1215* (2013.01); *H04L 5/006* (2013.01); *H04L 5/0062* (2013.01); *H04W 52/146* (2013.01); *H04W 88/12* (2013.01); *Y02D 30/70* (2020.08)

(58) Field of Classification Search
USPC ......................................................... 370/311
See application file for complete search history.

(56) References Cited

U.S. PATENT DOCUMENTS

| | | | |
|---|---|---|---|
| 2006/0116127 A1 | 6/2006 | Wilhoite et al. | |
| 2006/0195545 A1 | 8/2006 | Kikkawa et al. | |
| 2006/0210079 A1 | 9/2006 | Kato | |
| 2007/0226351 A1 | 9/2007 | Fischer et al. | |
| 2009/0279503 A1 | 11/2009 | Chin et al. | |
| 2009/0286576 A1* | 11/2009 | Lee | H04W 52/287 455/574 |
| 2010/0008336 A1 | 1/2010 | Keidar et al. | |
| 2010/0166098 A1 | 7/2010 | Luz et al. | |
| 2011/0002253 A1 | 1/2011 | Cha et al. | |
| 2012/0106490 A1 | 5/2012 | Nakashima et al. | |
| 2012/0155381 A1 | 6/2012 | Ballantyne et al. | |
| 2013/0028214 A1 | 1/2013 | Imamura et al. | |
| 2013/0114562 A1* | 5/2013 | Seo | H04W 52/16 370/329 |
| 2013/0215811 A1 | 8/2013 | Takaoka et al. | |
| 2015/0173023 A1* | 6/2015 | Wallerius | H04W 52/241 455/437 |
| 2016/0219509 A1 | 7/2016 | Fujishiro et al. | |

FOREIGN PATENT DOCUMENTS

| | | | | |
|---|---|---|---|---|
| WO | 2012/060067 A1 | 5/2012 | | |
| WO | WO-2013051987 A1 * | 4/2013 | ............ | H04W 52/40 |
| WO | WO-2013174426 A1 * | 11/2013 | ............ | H04W 36/18 |

OTHER PUBLICATIONS

Written Opinion issued in PCT/JP2014/072256; dated Oct. 7, 2014.

3rd Generation Partnership Project; Technical Specification Group Services and System Aspects; Feasibility study for Proximity Services (ProSe); 3GPP TR 22.803; V12.1.0; Mar. 2013; pp. 1-45; Release 12; 3GPP Organizational Partners.

NTT Docomo, Inc.; New Study Item Description: Small Cell enhancements for E-UTRA and E-UTRAN—Higher-layer aspects; 3GPP TSG-RAN Meeting#58; RP-122033; Dec. 4-7, 2012; pp. 1-5; Barcelona, Spain.

LG Electronics Inc., "Management of UE Transmit Power in Dual Connectivity", 3GPP TSG-RAN2 Meeting #83, R2-132582, Aug. 19-23, 2013, pp. 1-2, Barcelona, Spain.

An Office Action; "Notice of Reasons for Rejection" issued by the Japanese Patent Office on Nov. 7, 2017, which corresponds to Japanese Patent Application No. 2016-129788 and is related to U.S. Appl. No. 14/915,089; with English language Concise Explanation.

* cited by examiner

USER TERMINAL, COMMUNICATION CONTROL APPARATUS, AND PROCESSOR

CROSS-REFERENCE TO RELATED APPLICATIONS

This application is a Continuation of U.S. patent application Ser. No. 14/915,089 filed Feb. 26, 2016, which was the U.S. National Stage of International Application No. PCT/JP2014/072256 filed Aug. 6, 2014, which claims benefit of priority to Japanese Patent Application No. 2013-179432 filed on Aug. 30, 2013, the entire content of which is incorporated herein by reference.

TECHNICAL FIELD

The present disclosure relates to a user terminal, a communication control apparatus, and a processor used in a mobile communication system.

BACKGROUND ART

In 3GPP (3rd Generation Partnership Project) which is a project aiming to standardize a mobile communication system, the introduction of Device to Device (D2D) communication is discussed (see Non Patent Literature 1). The D2D communication is a communication mode in which a plurality of adjacent user terminals perform direct device-to-device communication without passing through a network.

Further, in the 3GPP, the introduction of a dual connectivity has been discussed (see Non Patent Literature 2). The dual connectivity is a communication mode in which a pair of connections are established by: a pair of cells, i.e., a combination of cells managed by different base stations; and a user terminal.

CITATION LIST

Non Patent Literature

[NPL 1] 3GPP technical report "TR 22. 803 V12.1.0" March, 2013
[NPL 2] 3GPP Contribution "RP-122033", December 2012

SUMMARY

A user equipment according to the present disclosure comprises a processor and a memory coupled to the processor. The processor is configured to receive, from a first base station, transmission power control information used for a dual simultaneous transmission in which radio signals are simultaneously transmitted to both the first base station and a second base station, and determine a first transmission power and a second transmission power for the dual simultaneous transmission based on the transmission power control information. The first transmission power is used for transmitting a radio signal to the first base station, and the second transmission power is used for transmitting a radio signal to the second base station.

A first base station according to the present disclosure comprises a processor and a memory coupled to the processor. The processor is configured to transmit, to a user equipment, transmission power control information used for a dual simultaneous transmission in which radio signals are simultaneously transmitted to both the first base station and a second base station. The transmission power control information is used by the user equipment to determine a first transmission power and a second transmission power for the dual simultaneous transmission, where the first transmission power is used for transmitting a radio signal to the first base station, and the second transmission power is used for transmitting a radio signal to the second base station.

A method used for a user equipment according to the present disclosure comprises receiving, from a first base station, transmission power control information used for a dual simultaneous transmission in which radio signals are simultaneously transmitted to both the first base station and a second base station, and determining, a first transmission power and a second transmission power for the dual simultaneous transmission based on the transmission power control information. The first transmission power is used for transmitting a radio signal to the first base station, and the second transmission power is used for transmitting a radio signal to the second base station.

DESCRIPTION OF EMBODIMENTS

[Overview of Embodiments]

Figure 1:
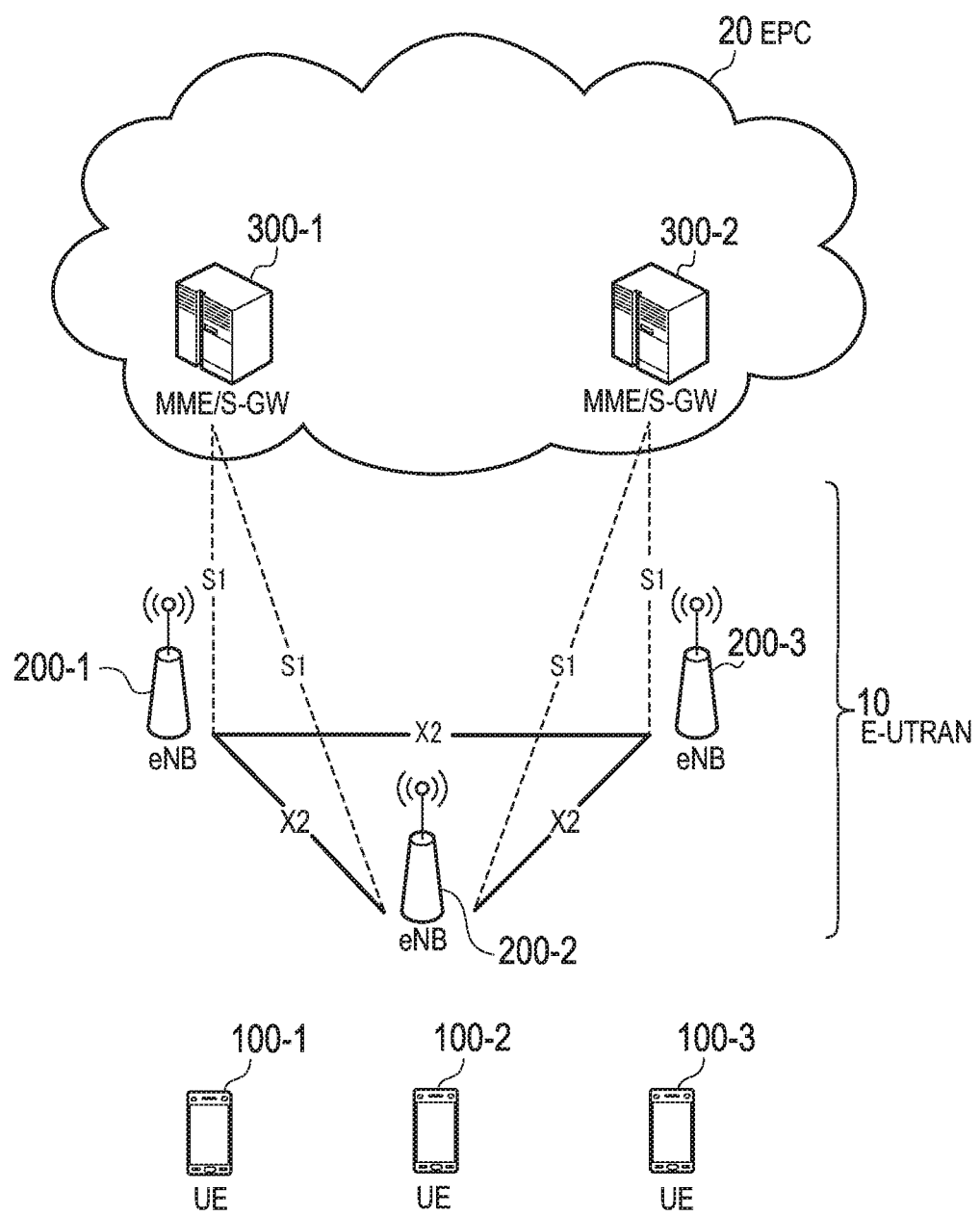
FIG. 1 is a configuration diagram of an LTE system according to a first embodiment to a fourth embodiment.

In the D2D communication and the dual connectivity described above, for example, a situation is assumed where a plurality of radio signals different in frequency are transmitted (simultaneously transmitted) at the same timing toward a plurality of transmission targets from a user terminal.

In such a situation, when there is a large difference in transmission power among the plurality of radio signals, an influence of interference by a radio signal large in transmission power causes a quality deterioration of a radio signal small in transmission power, and thus, it may not be possible to perform a normal signal transmission.

Therefore, in the embodiments, realization of a normal signal transmission even when a simultaneous transmission is performed.

A user terminal according to a first embodiment to a fourth embodiment transmits, to a transmission target, a radio signal in a mobile communication system. The user terminal comprises: a receiver configured to receive, from a communication control apparatus, a plurality of transmission power control parameters; and a controller configured to control a transmission power of the radio signal, on the basis of the plurality of transmission power control parameters. The plurality of transmission power control parameters include: a first transmission power control parameter applied to a single transmission in which one radio signal is singly transmitted; and a second transmission power control parameter applied to a simultaneous transmission in which a plurality of radio signals different in frequency are simultaneously transmitted to a plurality of transmission targets and/or a specific communication mode in which the simultaneous transmission may occur.

In the first embodiment to the fourth embodiment, the second transmission power control parameter is configured to reduce a difference in transmission power among the plurality of radio signals.

In operation pattern 1 according to the first embodiment, in the simultaneous transmission and/or the specific communication mode, the controller does not apply the first transmission power control parameter but applies the second transmission power control parameter to control the transmission power of each of the plurality of radio signals.

In operation pattern 2 according to the first embodiment, the second transmission power control parameter is a parameter indicating a difference from the first transmission power control parameter. In the simultaneous transmission and/or the specific communication mode, the controller applies the first transmission power control parameter and the second transmission power control parameter to control the transmission power of each of the plurality of radio signals.

In the first embodiment to the fourth embodiment, the first transmission power control parameter is arranged to correspond to each of the plurality of transmission targets. In the single transmission, the controller applies the first transmission power control parameter corresponding to the transmission target of the one radio signal to control the transmission power of the one radio signal.

In operation pattern 1 according to the third embodiment, the receiver receives the second transmission power control parameter when transitioning to the specific communication mode after receiving the first transmission power control parameter. After storing the first transmission power control parameter received by the receiver, the controller stores, without discarding the first transmission power control parameter, the second transmission power control parameter received by the receiver.

In operation pattern 2 according to the third embodiment, the controller transmits, to the communication control apparatus, capability information indicating a capability related to the simultaneous transmission and/or the specific communication mode. The receiver receives the second transmission power control parameter transmitted from the communication control apparatus in accordance with the capability information.

In operation pattern 3 according to the third embodiment, the controller requests, to the communication control apparatus, a transmission request for the second transmission power control parameter. The receiver receives the second transmission power control parameter transmitted from the communication control apparatus in accordance with the transmission request.

In operation pattern 1 according to the fourth embodiment, the controller transmits, when applying the second transmission power control parameter, to the communication control apparatus and at least one of the plurality of transmission targets information indicating applying or starting applying the second transmission power control parameter.

In operation pattern 1 according to the fourth embodiment, the controller transmits, when cancelling applying the second transmission power control parameter, to the communication control apparatus and at least one of the plurality of transmission targets, information indicating cancelling applying the second transmission power control parameter or applying the first transmission power control parameter.

In operation pattern 2 according to the fourth embodiment, the controller transmits, when determining that the simultaneous transmission and/or the specific communication mode are not possible even when the second transmission power control parameter is applied, to the communication control apparatus, information indicating that the simultaneous transmission and/or the specific communication mode are not possible.

In operation pattern 3 according to the fourth embodiment, the controller transmits, when starting communication in the specific communication mode, information indicating starting the communication in the specific communication mode, to the communication control apparatus. The controller transmits, when ending the communication in the specific communication mode, information indicating ending the communication in the specific communication mode, to the communication control apparatus.

A communication control apparatus according to the first embodiment to the fourth embodiment is used in a mobile communication system having a user terminal that transmits a radio signal to a transmission target. The communication control apparatus comprises a transmitter configured to transmit a plurality of transmission power control parameters to the user terminal. The plurality of transmission power control parameters include: a first transmission power control parameter applied to a single transmission in which one radio signal is singly transmitted; and a second transmission power control parameter applied to a simultaneous transmission in which a plurality of radio signals different in frequency are simultaneously transmitted to a plurality of transmission targets and/or a specific communication mode in which the simultaneous transmission may occur.

A processor according to the first embodiment to the fourth embodiment is provided in a user terminal that transmits a radio signal to a transmission target in a mobile communication system. The processor executes: a process of receiving, from a communication control apparatus, a plurality of transmission power control parameters; and a process of controlling a transmission power of the radio signal, on the basis of the plurality of transmission power control parameters. The plurality of transmission power control parameters include: a first transmission power control parameter applied to a single transmission in which one radio signal is singly transmitted; and a second transmission power control parameter applied to a simultaneous transmission in which a plurality of radio signals different in frequency are simultaneously transmitted to a plurality of transmission targets and/or a specific communication mode in which the simultaneous transmission may occur.

First Embodiment

An embodiment of applying the present disclosure to the LTE system will be described below.

(System Configuration)

FIG. 1 is a configuration diagram of an LTE system according to a first embodiment. As illustrated in FIG. 1, the LTE system according to a first embodiment includes a plurality of UEs (User Equipments) 100, E-UTRAN (Evolved-Universal Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
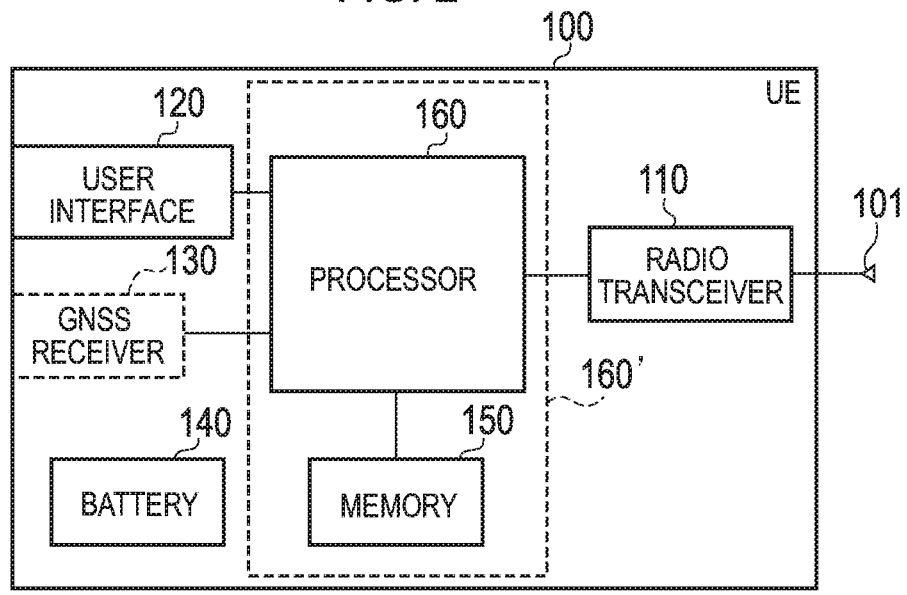
FIG. 2 is a block diagram of a UE according to the first embodiment to the fourth embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
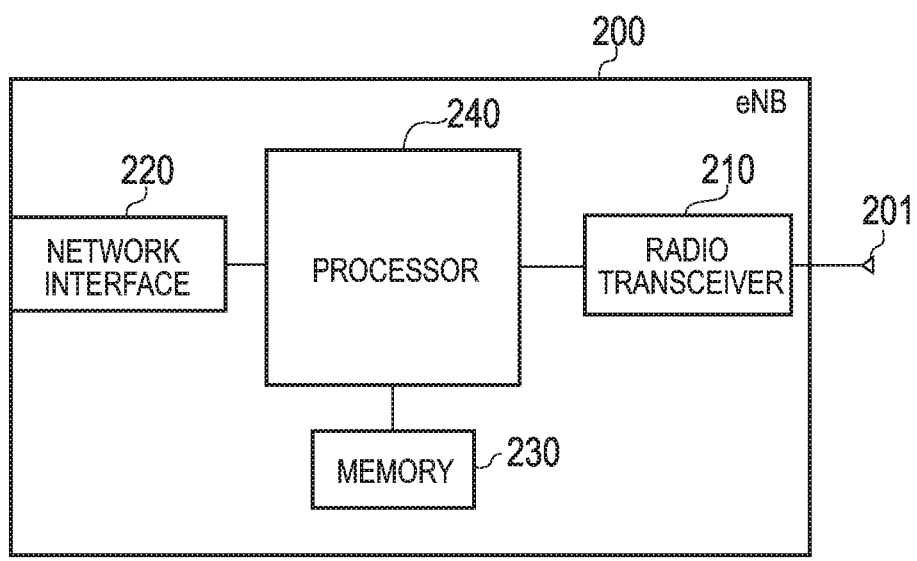
FIG. 3 is a block diagram of an eNB according to the first embodiment to the fourth embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
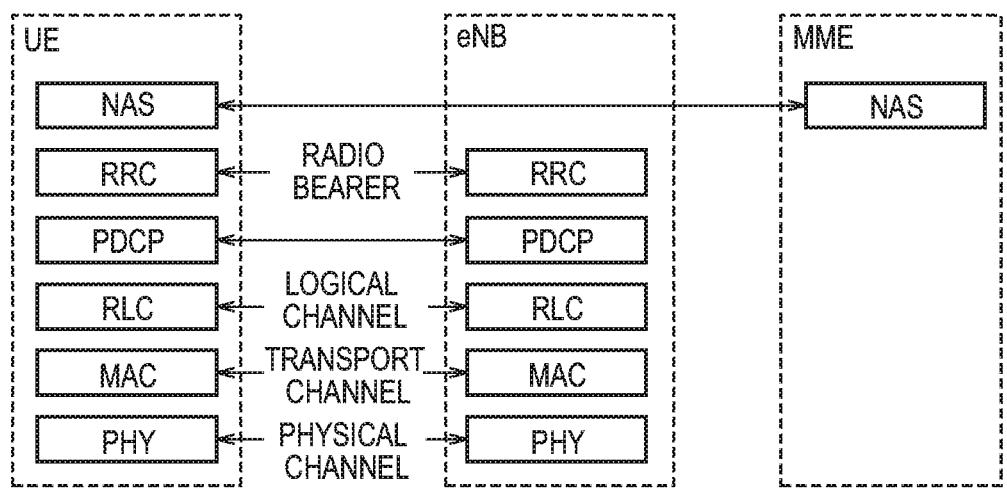
FIG. 4 is a protocol stack diagram of a radio interface according to the first embodiment to the fourth embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines (scheduling) a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
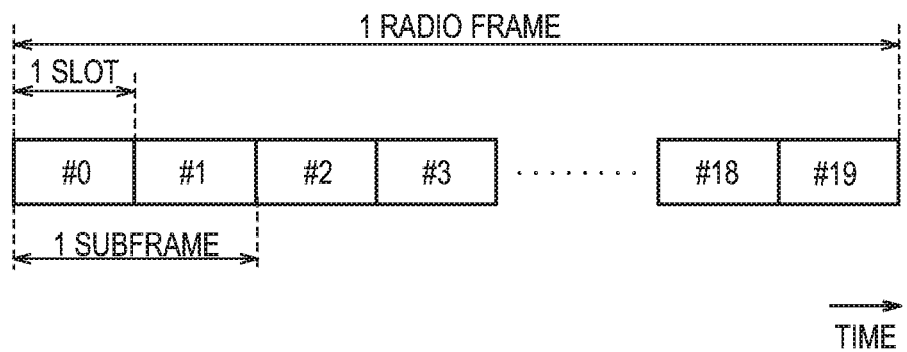
FIG. 5 is a configuration diagram of a radio frame according to the first embodiment to the fourth embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitute one resource element.

Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a downlink control signal. Furthermore, the other interval of each subframe is a region available as a physical downlink shared channel (PDSCH) for mainly transmitting downlink user data.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink user data.

(D2D Communication)

An LTE system according to the first embodiment supports D2D communication that is direct device-to-device communication (UE-to-UE communication). In the first embodiment, the D2D communication corresponds to a specific communication mode. Here, description proceeds while the D2D communication is compared with cellular communication that is normal communication of the LTE system.

The cellular communication is a communication mode in which a data path passes through a network (E-UTRAN 10, EPC 20). The data path is a communication path for user data. On the other hand, the D2D communication is a communication mode in which a data path set between UEs does not pass through the network. A plurality of UEs 100 adjacent to each other directly perform radio communication with a low transmission power, in a cell of the eNB 200. Thus, when the plurality of adjacent UEs 100 directly perform radio communication with low transmission power, it is possible to reduce a power consumption of the UE 100 and to reduce interference to a neighbouring cell, in comparison with the cellular communication.

(Operation According to First Embodiment)

Next, an operation according to the first embodiment will be described.

(1) Operation Overview

Figure 6:
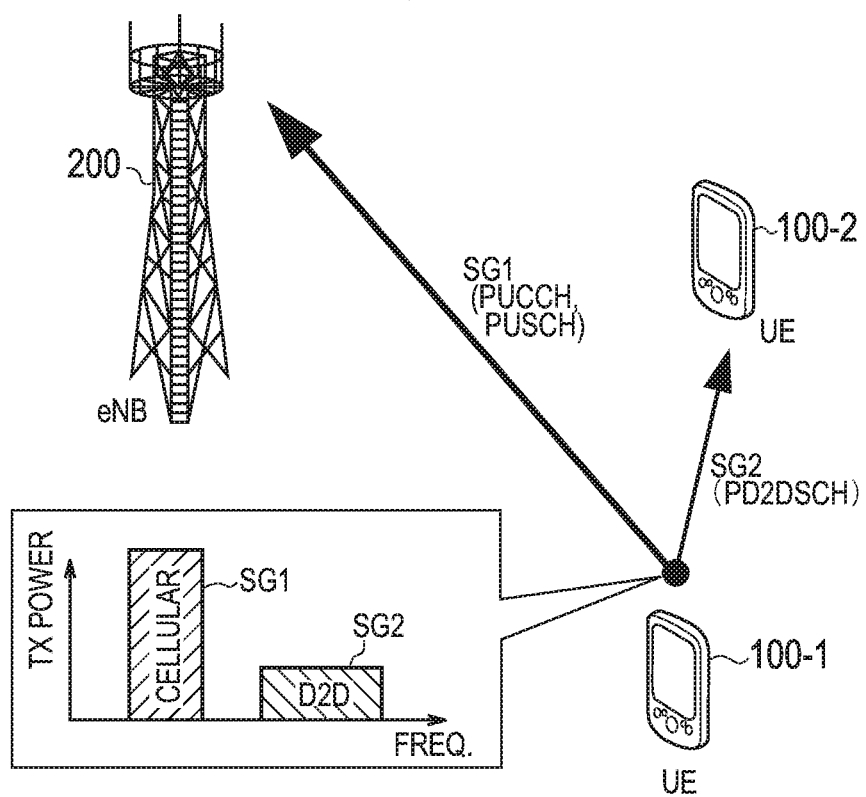
FIG. 6 is a diagram for describing an operation environment according to the first embodiment to the fourth embodiment.
Figure 7:
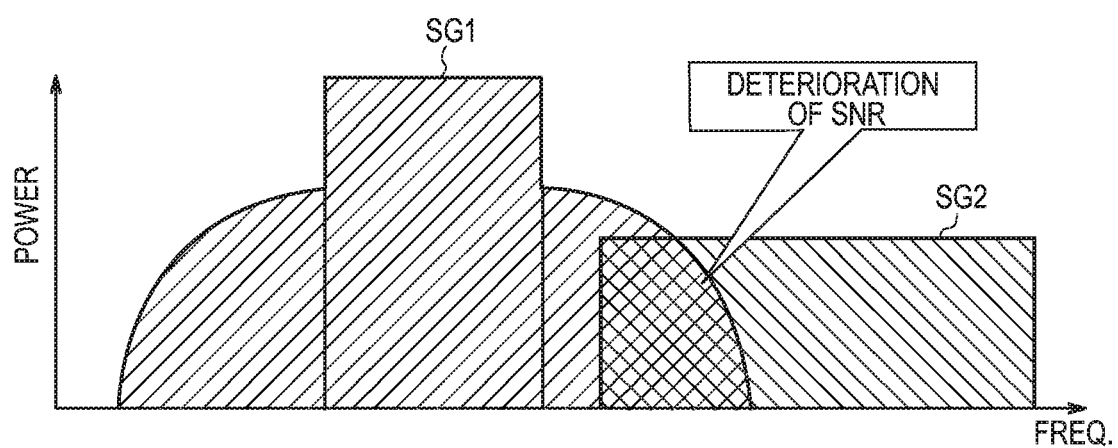
FIG. 7 is a diagram for describing a problem occurring in the operation environment shown in FIG. 6.

In the LTE system supporting the D2D communication, it may be possible that a plurality of radio signals different in frequency are simultaneously transmitted from the UE 100 to a plurality of transmission targets. FIG. 6 is a diagram for describing an operation environment according to the first embodiment. FIG. 7 is a diagram for describing a problem occurring in an operation environment according to the first embodiment.

As shown in FIG. 6, in a cell managed by the eNB 200 (hereinafter, simply referred to as "cell of the eNB 200"), a UE 100-1 and a UE 100-2 exist. Under the control of the eNB 200, the UE 100-1 performs the cellular communication with the eNB 200 and performs the D2D communication with the UE 100-2.

Firstly, the eNB 200 sets a transmission power control (TPC) parameter A for controlling a transmission power of a radio signal SG1 in the cellular communication and a TPC parameter B for controlling a transmission power of a radio signal SG2 in the D2D communication, to the UE 100-1. The TPC parameters A and B corresponds to a first TPC parameter applied to a single transmission where one radio signal is independently transmitted. To the TPC parameters A and B, the same parameter may be set and a different parameter may be set.

Secondly, the eNB 200 assigns a cellular radio resource for performing the cellular communication and a D2D radio resource for performing the D2D communication, to the UE 100-1. The cellular radio resource includes a PUCCH resource and a PUSCH resource, for example. The D2D radio resource includes a physical D2D shared channel (PD2DSCH) resource, for example.

The UE 100-1 transmits the radio signal SG1 to the eNB 200 and transmits the radio signal SG2 to the UE 100-2. When the cellular radio resource and the D2D radio resource overlap in a time direction, the UE 100-1 simultaneously transmits the radio signal SG1 and the radio signal SG2. In this case, the UE 100-1 transmits the radio signal SG1 to the eNB 200 (first transmission target) and transmits the radio signal SG2 to the UE 100-2 (second transmission target). The radio signal SG1 and the radio signal SG2 differ in frequency. The UE 100-2 receives the radio signal SG2, and at that time, unintentionally receives the radio signal SG1 as well.

In the operation environment shown in FIG. 6, the UE 100-1 is located far from the eNB 200. Further, the UE 100-1 is located near the UE 100-2 that is as a communication partner of the D2D communication. Thus, the UE 100-1 transmits the radio signal SG1 with high transmission power in accordance with the TPC parameter A. On the other hand, the UE 100-1 transmits the radio signal SG2 with low transmission power in accordance with the TPC parameter B. As a result, the UE 100-2 receives the radio signal SG1 with high received power and receives the radio signal SG2 with low received power.

As shown in FIG. 7, when there is a large difference in power between the radio signal SG1 and the radio signal SG2, an influence of interference by the radio signal SG1 large in power degrades a signal-to-noise ratio (SNR) of the radio signal SG2 small in power, possibly resulting in a situation where it is difficult to perform a normal signal transmission. Specifically, in the UE 100-1 at a transmission side, due to a transmission distortion of the radio signal SG1, a noise by a leaked power of the radio signal SG1 enters the radio signal SG2, and thus, the SNR of the radio signal SG2 may be degraded in the UE 100-2. Alternatively, even when the noise does not enter the radio signal SG2 in the UE 100-1, the SNR of the radio signal SG2 may be degraded in the UE 100-2 due to the reception distortion (reception blocking and IM response) by the radio signal SG1.

Thus, when a plurality of radio signals different in frequency are simultaneously transmitted from the UE 100 to a plurality of transmission targets, if there is a large difference in transmission power among the plurality of radio signals, then it may not be possible to perform a normal signal transmission.

Therefore, in addition to the first TPC parameter (TPC parameters A and B) described above, a second TPC parameter (TPC parameter C) is newly introduced. In the first embodiment, the second TPC parameter (TPC parameter C) is applied to a simultaneous transmission in which a plurality of radio signals different in frequency are simultaneously transmitted to a plurality of transmission targets. The eNB 200 (communication control apparatus) according to the first embodiment transmits the first TPC parameter (TPC parameters A and B) and the second TPC parameter (TPC parameter C), to the UE 100-1. The UE 100-1 receives the first TPC parameter (TPC parameters A and B) and the second TPC parameter (TPC parameter C), from the eNB 200.

When such a second TPC parameter (TPC parameter C) for simultaneous transmission is introduced, it is possible to control the transmission power during simultaneous transmission separately of the transmission power during single transmission, and it is possible to appropriately control the transmission power during the simultaneous transmission.

(2) Specific Example of TPC Parameter

Next, a specific example of the TPC parameter will be described; however, each parameter shown below is an example and various modifications may be applied.

The TPC parameter A is a TPC parameter for controlling the transmission power of the radio signal SG1 in the cellular communication. The UE 100-1 determines the transmission power of the radio signal SG1 in the cellular communication, in accordance with the TPC parameter A. The UE 100-1 determines transmission power PPUSCH in PUSCH of the cellular communication with the following equation, for example.

$$P_{PUSCH,c}(i) = \min \begin{Bmatrix} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{Bmatrix} [dBm] \quad \text{[Math. 1]}$$

Here, PCMAX indicates a UE maximum transmission power; MPUSCH indicates an instantaneous PUSCH bandwidth calculated from a resource block number; P0_PUSCH indicates a desired received power; α indicates a pathloss correction value; ΔTF indicates a correction value according to a transmission format; and f indicates a correction value by a power control command. For example, P0_PUSCH and α are cell-specific TPC parameters broadcast as a part of the system information (SIB). Here, P0_PUSCH and α correspond to the TPC parameter A. It is noted that actually, P0_PUSCH is expressed by the sum of a cell-specific P0_Nominal_PUSCH broadcast by the SIB and a UE-specific P0_UE_PUSCH notified by the RRC message.

The TPC parameter B is a TPC parameter for controlling the transmission power of the radio signal SG2 in the D2D communication. The UE 100-1 determines the transmission power of the radio signal SG2 in the D2D communication, in accordance with the TPC parameter B. The UE 100-1 determines transmission power PPD2DSCH in the PD2DSCH of the D2D communication with an equation (in which PUSCH is substituted by PD2DSCH) similar to the above-described equation, for example.

The TPC parameter C is a TPC parameter for reducing a difference in transmission power between the radio signal SG1 and the radio signal SG2, in the simultaneous transmission in which the radio signal SG1 in the cellular communication and the radio signal SG2 in the D2D communication are simultaneously transmitted. The TPC parameter C may be broadcast as a part of system information and may be notified by an individual RRC message.

In an operation pattern 1 according to the first embodiment, the TPC parameter C is a TPC parameter applied instead of the TPC parameter A or B in the simultaneous transmission.

For example, when the TPC parameter C is applied instead of the TPC parameter A, the TPC parameter C is P0_PUSCH for simultaneous transmission (P0-UE-PUSCH-simultaneous) and α for simultaneous transmission (alpha-PUSCH-simultaneous). Here, the P0_PUSCH for simultaneous transmission is set smaller than P0_PUSCH for single transmission. Further, the α for simultaneous transmission is set smaller than α for single transmission. As a result, it is possible to make the PUSCH transmission power PPUSCH during simultaneous transmission smaller than the PUSCH transmission power PPUSCH during single transmission, and thus, it is possible to reduce a difference in transmission power during simultaneous transmission.

Alternatively, when the TPC parameter C is applied instead of the TPC parameter B, the TPC parameter C is P0_PD2DSCH for simultaneous transmission (P0-UE-PD2DSCH-simultaneous) and α for simultaneous transmission (alpha-PD2DSCH-simultaneous). Here, the P0_PD2DSCH for simultaneous transmission is set larger than P0_PD2DSCH for single transmission. Further, the α for simultaneous transmission is set larger than α for single transmission. As a result, it is possible to make the PD2DSCH transmission power PPD2DSCH during simultaneous transmission larger than the PD2DSCH transmission power PPD2DSCH during single transmission, and thus, it is possible to reduce a difference in transmission power during simultaneous transmission.

Thus, in the operation pattern 1 according to the first embodiment, the UE 100-1 does not apply the TPC parameter A or B in the simultaneous transmission, but applies the TPC parameter C to control the transmission power of each of the radio signal SG1 and the radio signal SG2.

In an operation pattern 2 according to the first embodiment, the TPC parameter C is a TPC parameter indicating a difference from the TPC parameter A or B. In the simultaneous transmission, the UE 100-1 applies the TPC parameter A (or B) and the TPC parameter C to control the transmission power of each of the radio signal SG1 and the radio signal SG2.

For example, when the TPC parameter C indicates a difference value from the TPC parameter A, the TPC parameter C is a negative offset value added to P0_PUSCH and a negative offset value added to α. As a result, it is possible to make the PUSCH transmission power PPUSCH during simultaneous transmission smaller than the PUSCH transmission power PPUSCH during single transmission, and thus, it is possible to reduce a difference in transmission power during simultaneous transmission.

Alternatively, when the TPC parameter C indicates a difference value from the TPC parameter B, the TPC parameter C is a positive offset value added to P0_PD2DSCH and a positive offset value added to α. As a result, it is possible to make the PD2DSCH transmission power PPD2DSCH during simultaneous transmission larger than the PD2DSCH transmission power PPD2DSCH during single transmission, and thus, it is possible to reduce a difference in transmission power during simultaneous transmission.

(3) Operation Sequence

Figure 8:
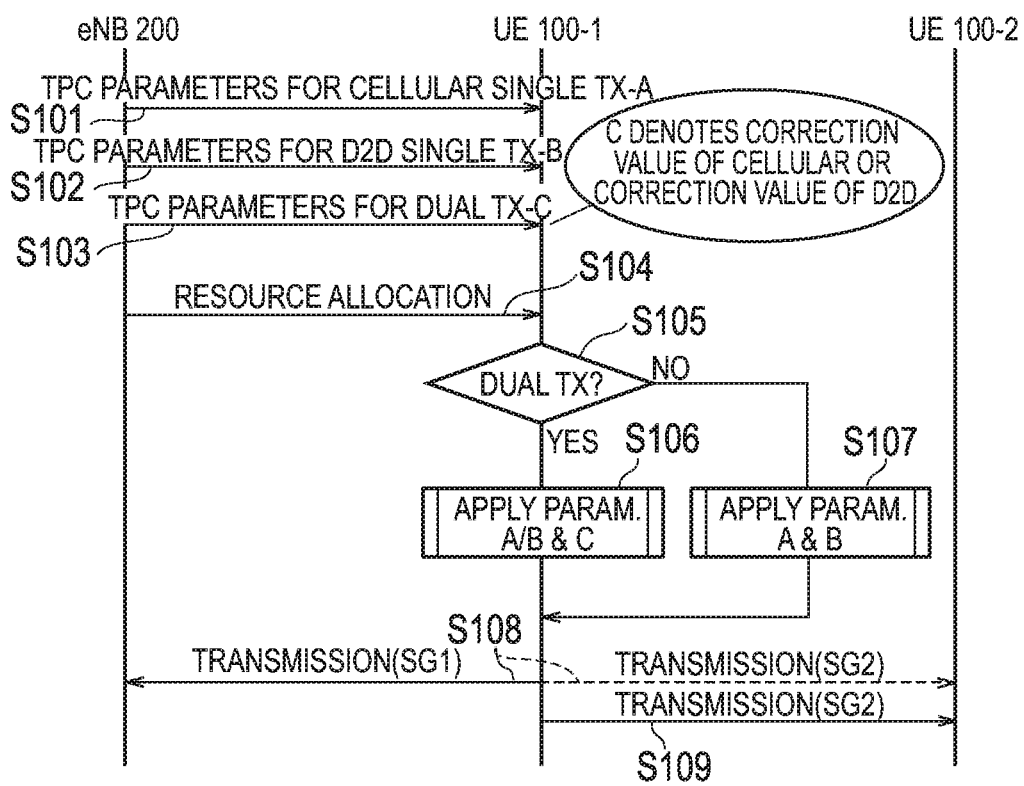
FIG. 8 is a sequence diagram according to the first embodiment.

FIG. 8 is a sequence diagram according to the first embodiment. Here, an operation pattern 2 according to the first embodiment will be described as an example.

As shown in FIG. 8, in step S101, the eNB 200 transmits a TPC parameter A for cellular communication, to the UE 100-1. The UE 100-1 that receives the TPC parameter A stores the TPC parameter A.

In step S102, the eNB 200 transmits a TPC parameter B for D2D communication, to the UE 100-1. The UE 100-1 that receives the TPC parameter B stores the TPC parameter B. It is noted that when the same parameter is set as the TPC parameters A and B, it is possible to omit the step S102.

In step S103, the eNB 200 transmits a TPC parameter C for simultaneous transmission, to the UE 100-1. The UE 100-1 that receives the TPC parameter C stores the TPC parameter C. It is noted that the order of the steps S101 to S103 may be changed.

In step S104, the eNB 200 determines the cellular radio resource and the D2D radio resource assigned to the UE 100-1, and notifies the UE 100-1 of the determined cellular radio resource and D2D radio resource.

In step S105, the UE 100-1 determines on the basis of the notified cellular radio resource and D2D radio resource whether or not the simultaneous transmission in which the radio signal SG1 in the cellular communication and the radio signal SG2 in the D2D communication are simultaneously transmitted occurs. For example, the UE 100-1 determines that the simultaneous transmission occurs when a subframe configuring the cellular radio resource and a subframe configuring the D2D radio resource overlap.

When determining that the simultaneous transmission occurs (step S105: YES), in step S106, the UE 100-1 applies the TPC parameters A, B, and C to determine the transmission power of each of the radio signal SG1 and the radio signal SG2. Then, in step S108, the UE 100-1 simultaneously transmits the radio signal SG1 and the radio signal SG2 with the determined transmission power.

On the other hand, when determining that the simultaneous transmission does not occur (that is, the single transmission is performed) (step S105: NO), in step S107, the UE 100-1 does not apply the TPC parameter C but applies the TPC parameters A and B to determine the transmission power of each of the radio signal SG1 and the radio signal SG2. Then, in (a solid arrow) of step S108 and S109, the UE 100-1 singly transmits the radio signal SG1 and the radio signal SG2 with the determined transmission power.

(Summary of First Embodiment)

As described above, in the first embodiment, when such a second TPC parameter (TPC parameter C) for simultaneous transmission is introduced, it is possible to control the transmission power during simultaneous transmission separately of the transmission power during single transmission, and it is possible to appropriately control the transmission power during the simultaneous transmission.

In the first embodiment, the second TPC parameter (TPC parameter C) is configured to reduce the difference in transmission power between the radio signal SG1 and the radio signal SG2. Thus, it is possible to restrain an SNR deterioration due to the influence of interference from the radio signal SG1 to the radio signal SG2, and thus, it is possible to realize a normal signal transmission even when the simultaneous transmission is performed.

In the operation pattern 1 according to the first embodiment, in the simultaneous transmission, the UE 100-1 does not apply the first TPC parameter (TPC parameter A or B), but applies the second TPC parameter (TPC parameter C) to control the transmission power of each of the radio signal SG1 and the radio signal SG2.

In the operation pattern 2 according to the first embodiment, the second TPC parameter (TPC parameter C) is a parameter indicating a difference from the first TPC parameter (TPC parameter A or B). In the simultaneous transmission, the UE 100-1 applies the first TPC parameter (TPC parameters A and B) and the second TPC parameter (TPC parameter C) to control the transmission power of each of the radio signal SG1 and the radio signal SG2.

Thus, in either the operation pattern 1 or 2, it is possible to reduce a difference in the transmission power between the radio signal SG1 and the radio signal SG2.

The first TPC parameter is arranged to correspond to each of a plurality of transmission targets (the eNB 200 and the UE 100-2). In the first embodiment, the first TPC parameter includes the TPC parameter A in which the eNB 200 is the transmission target and the TPC parameter B in which the UE 100-2 is the transmission target. In the single transmission, the UE 100-1 applies the first TPC parameter corresponding to the transmission target of the radio signal to control the transmission power of the radio signal. That is, in the single transmission of the radio signal SG1, the UE 100-1 applies the TPC parameter A and controls the transmission power of the radio signal SG1. Further, in the single transmission of the radio signal SG2, the UE 100-1 applies the TPC parameter B and controls the transmission power of the radio signal SG2. Thus, it is possible to appropriately control the transmission power during single transmission.

Second Embodiment

In a second embodiment, description proceeds with a particular focus on a difference from the first embodiment. The second embodiment is similar to the first embodiment in regard to the system configuration.

(Dual Connectivity)

Figure 9:
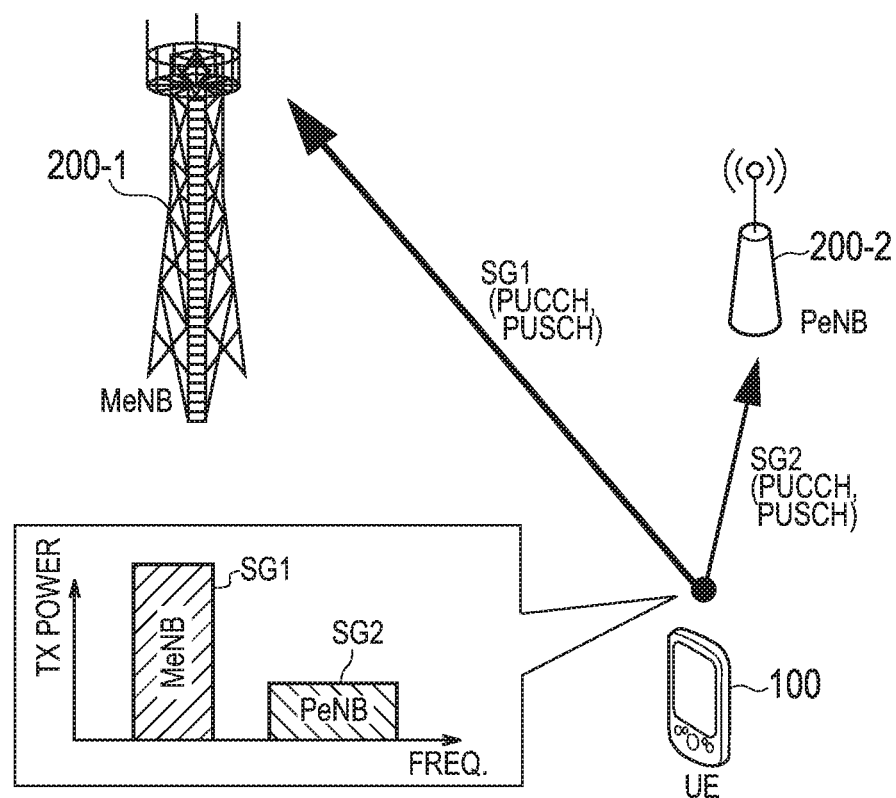
FIG. 9 is a diagram for describing an operation environment according to the second embodiment.

An LTE system according to the second embodiment supports a dual connectivity. In the second embodiment, the dual connectivity corresponds to a specific communication mode. FIG. 9 is a diagram for describing an operation environment according to the second embodiment.

As shown in FIG. 9, the UE 100 establishes a dual connectivity with a pair of eNBs 200 (an MeNB 200-1 and a PeNB 200-2). The MeNB 200-1 is a large-scale base station (macro eNB) that manages a large-scale cell. The PeNB 200-2 is a small-scale base station (pico eNB) that manages a small-scale cell.

The MeNB 200-1 performs mobility control (Mobility management) on the UE 100. The MeNB 200-1 establishes an RRC connection with the UE 100, and performs handover control and the like on the UE 100-1. In contrast, the PeNB 200-2 does not perform the mobility control on the UE 100. The PeNB 200-2 may suffice to establish a connection (L2 connection) with the UE 100 up to at least the MAC layer or the RLC layer, and may not necessarily establish an RRC connection (L3 connection).

In the dual connectivity, when performing the cellular communication with a pair of eNBs 200, the UE 100 is capable of performing cellular communication having a high speed and large capacity as compared to a case where the cellular communication is performed only with one eNB 200.

(Operation According to Second Embodiment)

Next, an operation according to the second embodiment will be described.

(1) Operation Overview

As shown in FIG. 9, the UE 100 performs the cellular communication with the MeNB 200-1 under the control of the MeNB 200-1 and performs the cellular communication with the PeNB 200-2 under the control of the PeNB 200-2.

Firstly, the MeNB 200-1 sets, to the UE 100, the TPC parameter A for controlling the transmission power of the radio signal SG1 for the MeNB 200-1. The eNB 200-2 sets, to the UE 100, the TPC parameter B used for controlling the transmission power of the radio signal SG2 for the PeNB 200-2. The TPC parameters A and B corresponds to a first TPC parameter applied to a single transmission where one radio signal is independently transmitted.

Secondly, the MeNB 200-1 assigns, to the UE 100, a cellular radio resource 1 used for performing the uplink communication. The PeNB 200-2 assigns, to the UE 100, a cellular radio resource 2 used for performing the uplink communication. Each of the cellular communication resources 1 and 2 includes a PUCCH resource and a PUSCH resource, for example.

The UE 100 transmits the radio signal SG1 to the MeNB 200-1 and transmits the radio signal SG2 to the PeNB 200-2. When the cellular radio resource 1 and the cellular radio resource 2 overlap in a time direction, the UE 100 simultaneously transmits the radio signal SG1 and the radio signal SG2. In this case, the UE 100 transmits the radio signal SG1 to the MeNB 200-1 (first transmission target) and transmits the radio signal SG2 to the PeNB 200-2 (second transmission target). The radio signal SG1 and the radio signal SG2 differ in frequency. The PeNB 200-2 receives the radio signal SG2, and at that time, unintentionally receives the radio signal SG1 as well.

In an operation environment shown in FIG. 9, the UE 100 is located far from the MeNB 200-1. Further, the UE 100 is located near the PeNB 200-2. Thus, the UE 100 transmits the radio signal SG1 with high transmission power in accordance with the TPC parameter A. On the other hand, the UE 100 transmits the radio signal SG2 with low transmission power in accordance with the TPC parameter B. As a result, the PeNB 200-2 receives the radio signal SG1 with high received power and receives the radio signal SG2 with low received power.

As described in the first embodiment, when there is a large difference in power between the radio signal SG1 and the radio signal SG2, an influence of interference by the radio signal SG1 large in power degrades a signal-to-noise ratio (SNR) of the radio signal SG2 small in power, possibly resulting in a situation where it is difficult to perform a normal signal transmission.

Therefore, similarly to the first embodiment, in addition to the first TPC parameter (TPC parameters A and B), the second TPC parameter (TPC parameter C) is newly introduced. In the second embodiment, the second TPC parameter (TPC parameter C) is applied to a simultaneous transmission in which a plurality of radio signals different in frequency are simultaneously transmitted to a plurality of transmission targets.

The MeNB 200-1 (communication control apparatus) according to the second embodiment transmits the first TPC parameter (TPC parameter A) and the second TPC parameter (TPC parameter C), to the UE 100. Further, the PeNB 200-2 transmits the first TPC parameter (TPC parameter B) to the UE 100.

The UE 100 receives the first TPC parameter (TPC parameter A) and the second TPC parameter (TPC parameter C), from the MeNB 200-1. Further, the UE 100 receives the first TPC parameter (TPC parameter B) from the PeNB 200-2.

When such a second TPC parameter (TPC parameter C) for simultaneous transmission is introduced, it is possible to control the transmission power during simultaneous transmission separately of the transmission power during single transmission, and it is possible to appropriately control the transmission power during the simultaneous transmission. Thus, it is possible to realize a normal signal transmission even when the simultaneous transmission is performed.

In a specific example of the TPC parameter (TPC parameters A, B, and C), it is necessary that the PD2DSCH is substituted with the PUSCH in the TPC parameter B according to the first embodiment, and the other features are in much the same way as in the first embodiment. Further, either one of the operation pattern 1 or 2 according to the first embodiment may be applied to the second embodiment. That is, the TPC parameter C is a TPC parameter applied instead of the TPC parameter A or B in the simultaneous transmission, or a TPC parameter indicating a difference from the TPC parameter A or B. The TPC parameter C is configured to reduce a difference in transmission power between the radio signal SG1 and the radio signal SG2.

(2) Operation Sequence

Figure 10:
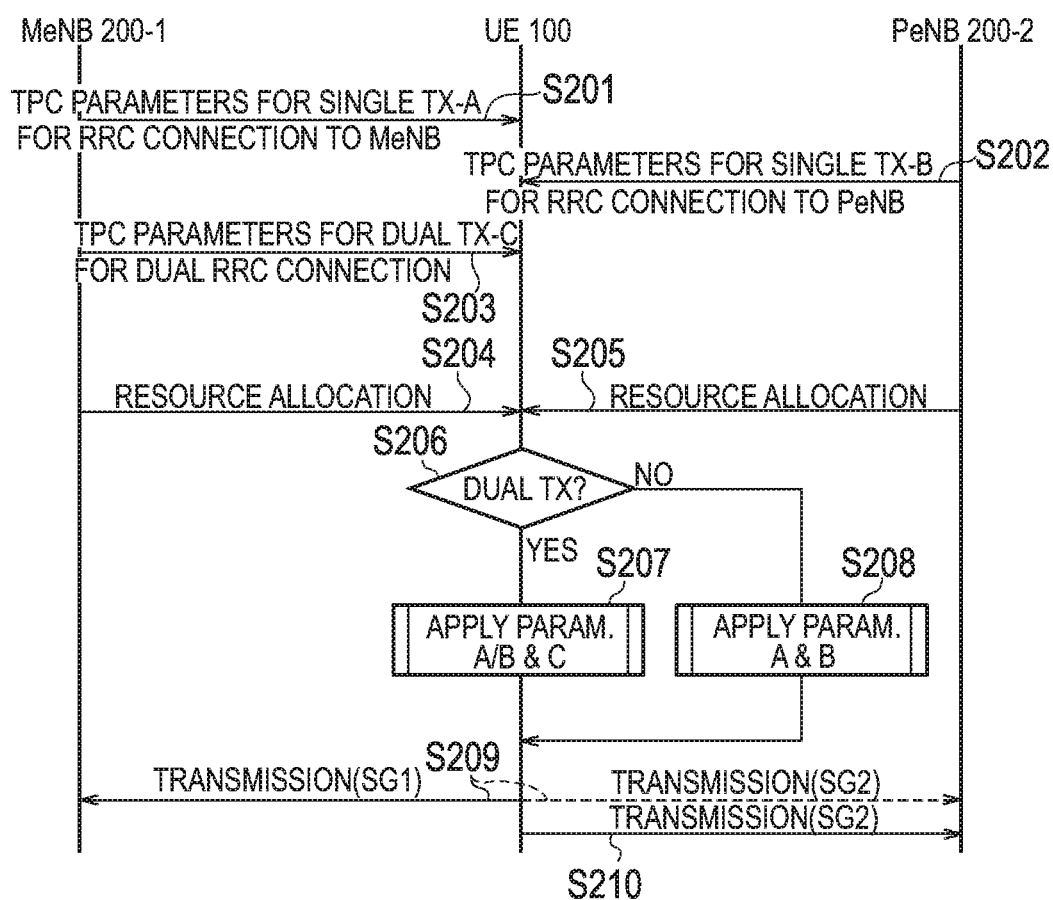
FIG. 10 is a sequence diagram according to the second embodiment.

FIG. 10 is a sequence diagram according to the second embodiment. Here, an example where the TPC parameter C is a TPC parameter indicating a difference from the TPC parameter A or B will be described.

As shown in FIG. 10, in step S201, the MeNB 200-1 transmits the TPC parameter A for cellular communication, to the UE 100. The UE 100 that receives the TPC parameter A stores the TPC parameter A.

In step S202, the PeNB 200-2 transmits the TPC parameter B for cellular communication, to the UE 100. The UE 100 that receives the TPC parameter B stores the TPC parameter B. It is noted that when the same parameter is set as the TPC parameters A and B, it is possible to omit the step S202.

In step S203, the MeNB 200-1 transmits the TPC parameter C for simultaneous transmission, to the UE 100. The UE 100 that receives the TPC parameter C stores the TPC parameter C. It is noted that the order of the steps S201 to S203 may be changed.

In step S204, the MeNB 200-1 determines the cellular radio resource 1 assigned to the UE 100, and notifies the UE 100 of the determined cellular radio resource 1.

In step S205, the PeNB 200-2 determines the cellular radio resource 2 assigned to the UE 100, and notifies the UE 100 of the determined cellular radio resource 2.

In step S206, the UE 100 determines on the basis of the notified cellular radio resource 1 and cellular radio resource 2 whether or not the simultaneous transmission in which the radio signal SG1 for the MeNB 200-1 and the radio signal SG2 for the PeNB 200-2 are simultaneously transmitted occurs. For example, the UE 100 determines that the simultaneous transmission occurs when a subframe configuring the cellular radio resource 1 and a subframe configuring the cellular radio resource 2 overlap.

When determining that the simultaneous transmission occurs (step S206: YES), in step S207, the UE 100 applies the TPC parameters A, B, and C to determine the transmission power of each of the radio signal SG1 and the radio signal SG2. Then, in step S209, the UE 100 simultaneously transmits the radio signal SG1 and the radio signal SG2 with the determined transmission power.

On the other hand, when determining that the simultaneous transmission does not occur (that is, the single transmission is performed (step S206: NO), in step S208, the UE 100 does not apply the TPC parameter C but applies the TPC parameters A and B to determine the transmission power of each of the radio signal SG1 and the radio signal SG2. Then, in (a solid arrow) of step S209 and S210, the UE 100 singly transmits each of the radio signal SG1 and the radio signal SG2 with the determined transmission power.

(Summary of Second Embodiment)

As described above, in the second embodiment, similarly to the first embodiment, when such a second TPC parameter (TPC parameter C) for simultaneous transmission is introduced, it is possible to control the transmission power during simultaneous transmission separately of the transmission power during single transmission, and it is possible to appropriately control the transmission power during the simultaneous transmission.

Further, the second TPC parameter (TPC parameter C) is configured to reduce the difference in transmission power between the radio signal SG1 and the radio signal SG2. Thus, it is possible to restrain an SNR deterioration due to the influence of interference from the radio signal SG1 to the radio signal SG2, and thus, it is possible to realize a normal signal transmission even when the simultaneous transmission is performed.

Third Embodiment

In a third embodiment, description proceeds with a particular focus on a difference from the first embodiment and the second embodiment. A system configuration and an operation environment according to the third embodiment are the same as those in the first embodiment. It is noted that the third embodiment may be applied to the operation environment according to the second embodiment.

(Operation According to Third Embodiment)

In the third embodiment, a specific example of an order of setting a plurality of TPC parameters (TPC parameters A, B, and C) will be described.

(1) Operation Pattern 1

Figure 11:
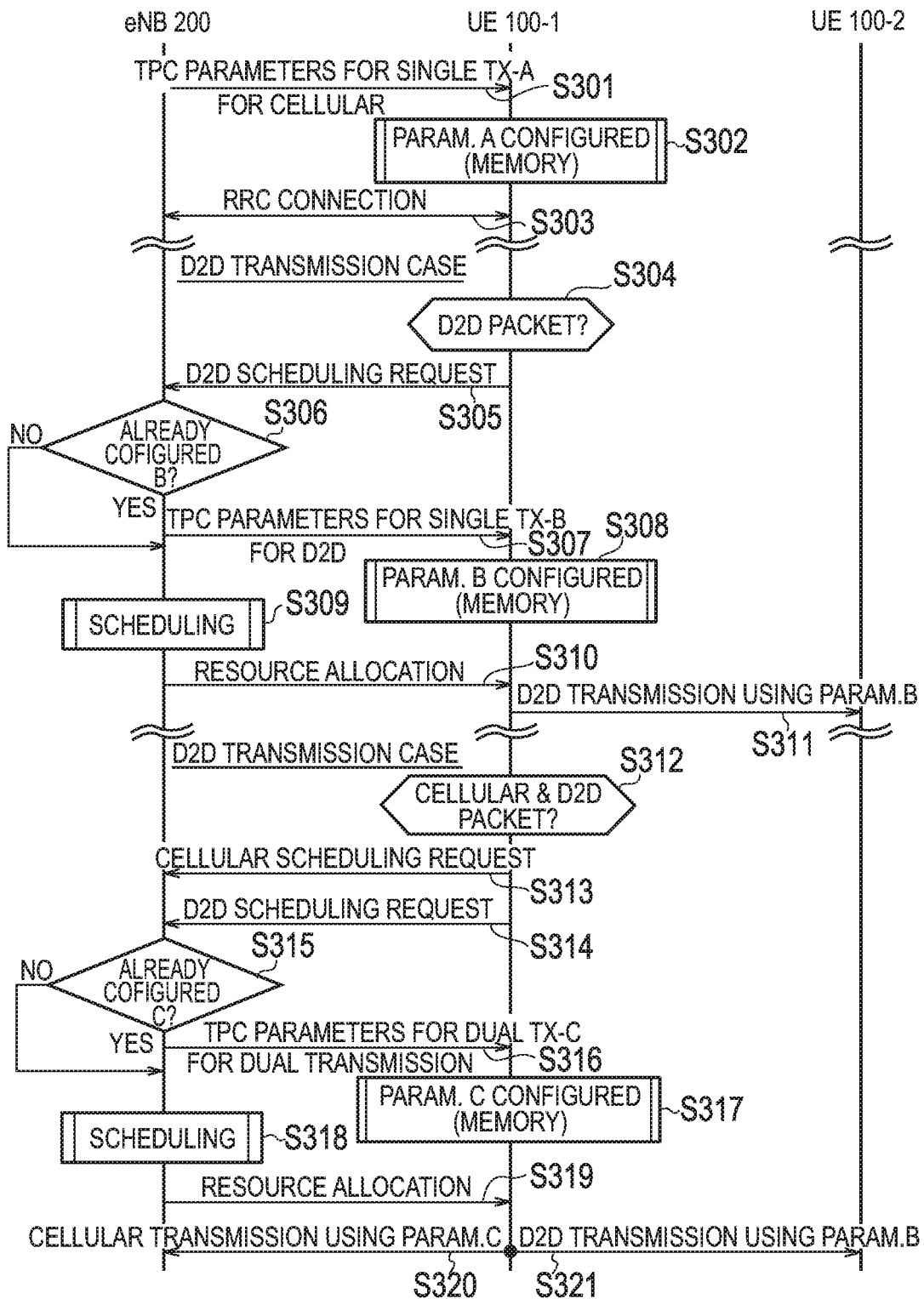
FIG. 11 is a sequence diagram of an operation pattern 1 according to the third embodiment.

FIG. 11 is a sequence diagram of an operation pattern 1 according to the third embodiment. In the operation pattern 1 according to the third embodiment, the TPC parameter is sequentially set where necessary.

As shown in FIG. 11, in step S301, the eNB 200 (communication control apparatus) transmits the TPC parameter A for cellular communication, to the UE 100-1. In step S302, the UE 100-1 that receives the TPC parameter A stores the TPC parameter A. In step S303, if in an idle state, then the UE 100-1 establishes an RRC connection with the eNB 200.

In step S304, the UE 100-1 determines whether or not there occurs data (D2D packet) to be transmitted to the UE 100-2. Here, description proceeds with an assumption that the data to be transmitted to the UE 100-2 occurs.

In step S305, the UE 100-1 transmits a D2D radio resource assignment request (D2D scheduling Request) to the eNB 200.

In step S306, the eNB 200 that receives the D2D radio resource assignment request determines whether or not the TPC parameter B for D2D communication is set to the UE 100-1. When the TPC parameter B is not set to the UE 100-1, in step S307, the eNB 200 transmits the TPC parameter B to the UE 100-1. When grasping a cellular transmission power value of the UE 100-1, the eNB 200 may calculate a value of the TPC parameter B in accordance with the cellular transmission power value. In step S308, the UE 100 that receives the TPC parameter B stores the TPC parameter B.

In step S309, the eNB 200 determines (schedules) a D2D radio resource to be assigned to the UE 100-1. In step S310, the eNB 200 notifies the UE 100-1 of the determined D2D radio resource.

In step S311, the UE 100-1 applies the TPC parameter B and determines the transmission power of the radio signal SG2, and transmits (singly transmits) the radio signal SG2, with the determined transmission power, to the UE 100-2.

In step S312, the UE 100-1 determines whether or not there occur data (cellular packet) to be transmitted to the eNB 200 and data (D2D packet) to be transmitted to the UE 100-2. Here, description proceeds with an assumption that the data to be transmitted to the eNB 200 and the data to be transmitted to the UE 100-2 occur.

In step S313, the UE 100-1 transmits a cellular radio resource assignment request (Cellular scheduling Request) to the eNB 200. In step S314, the UE 100-1 transmits the D2D radio resource assignment request (D2D scheduling Request) to the eNB 200. It is noted that steps S313 and S314 may be performed simultaneously.

In step S315, the eNB 200 that receives the cellular radio resource assignment request and the D2D radio resource assignment request determines whether or not the TPC parameter C for simultaneous transmission is set to the UE 100-1. When the TPC parameter C is not set to the UE 100-1, in step S316, the eNB 200 transmits the TPC parameter C to the UE 100-1. In step S317, the UE 100 that receives the TPC parameter C stores the TPC parameter C.

In step S318, the eNB 200 determines (schedules) the cellular radio resource and the D2D radio resource to be assigned to the UE 100-1. In step S319, the eNB 200 notifies the UE 100-1 of the determined cellular radio resource and D2D radio resource. Here, it is assumed that a subframe configuring the cellular radio resource and a subframe configuring the D2D radio resource overlap.

In steps S320 and S321, determining that the simultaneous transmission occurs, the UE 100-1 applies the TPC parameter A and/or TPC parameter B, and the TPC parameter C, determines the transmission power of each of the radio signal SG1 and the radio signal SG2, and simultaneously transmits the radio signal SG1 and the radio signal SG2 with the determined transmission power.

(2) Operation Pattern 2

Figure 12:
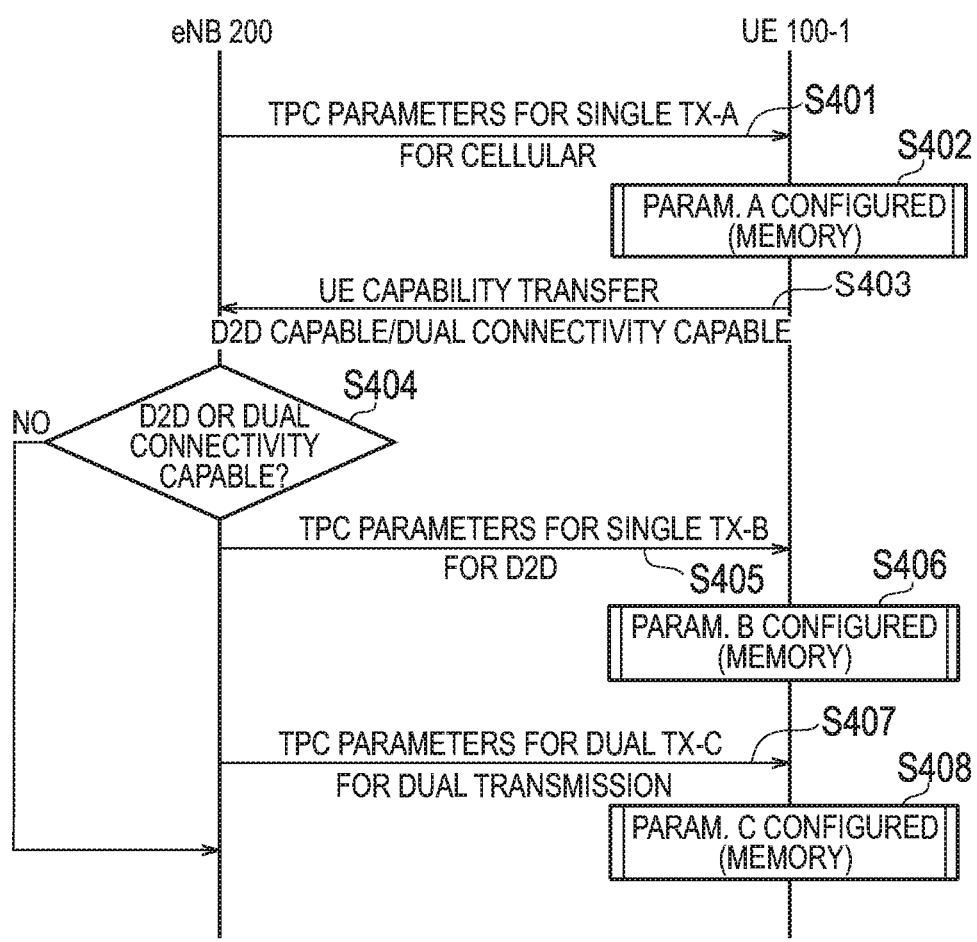
FIG. 12 is a sequence diagram of an operation pattern 2 according to the third embodiment.

FIG. 12 is a sequence diagram of an operation pattern 2 according to the third embodiment. In the operation pattern 2 according to the third embodiment, the TPC parameter is set in accordance with UE Capability.

As shown in FIG. 12, in step S401, the eNB 200 (communication control apparatus) transmits the TPC parameter A for cellular communication, to the UE 100-1. In step S402, the UE 100-1 that receives the TPC parameter A stores the TPC parameter A.

In step S403, the UE 100-1 transmits, to the eNB 200, capability (UE Capability) information indicating a capability related to the simultaneous transmission and/or the specific communication mode. In the third embodiment, the capability information is information (FGI bit) indicating whether or not the UE 100-1 supports the D2D communication. The capability information may be information (FGI bit) indicating whether or not the UE 100-1 supports the dual connectivity.

In step S404, the eNB 200 that receives the capability information determines on the basis of the capability information whether or not the UE 100-1 supports the D2D communication.

When it is determined that the UE 100-1 supports the D2D communication (step S404: YES), in step S405, the eNB 200 transmits the TPC parameter B for D2D communication to the UE 100-1. When grasping a cellular transmission power value of the UE 100-1, the eNB 200 may calculate a value of the TPC parameter B in accordance with the cellular transmission power value. In step S406, the UE 100-1 that receives the TPC parameter B stores the TPC parameter B. Further, in step S407, the eNB 200 transmits the TPC parameter C for simultaneous transmission to the UE 100-1. In step S408, the UE 100-1 that receives the TPC parameter C stores the TPC parameter C. It is noted that steps S405 and S407 may be performed simultaneously.

(3) Operation Pattern 3

Figure 13:
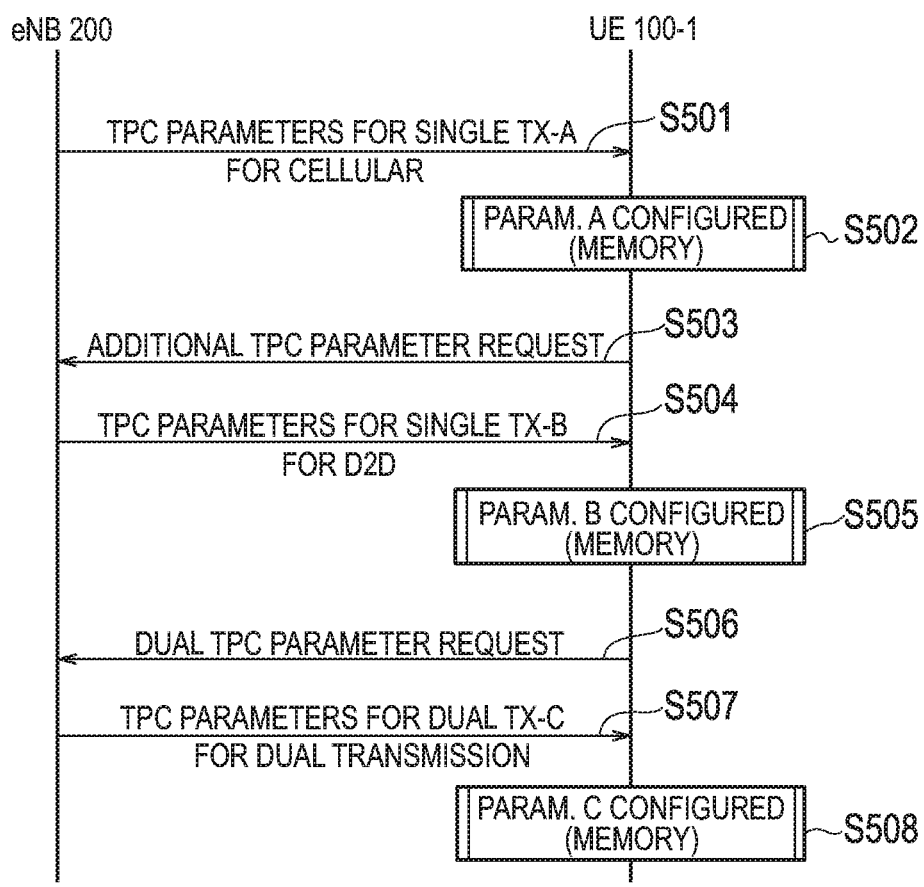
FIG. 13 is a sequence diagram of an operation pattern 3 according to the third embodiment.

FIG. 13 is a sequence diagram of an operation pattern 3 according to the third embodiment. In the operation pattern 3 according to the third embodiment, the TPC parameter is set in accordance with a request from the UE.

As shown in FIG. 13, in step S501, the eNB 200 (communication control apparatus) transmits the TPC parameter A for cellular communication, to the UE 100-1. In step S502, the UE 100-1 that receives the TPC parameter A stores the TPC parameter A.

In step S503, the UE 100-1 that attempts to start the D2D communication transmits a transmission request for the TPC parameter B for D2D communication, to the eNB 200. In step S504, the eNB 200 that receives the transmission request for the TPC parameter B for D2D communication transmits the TPC parameter B for D2D communication, to the UE 100-1. In step S505, the UE 100-1 that receives the TPC parameter B stores the TPC parameter B.

In step S506, the UE 100-1 transmits the transmission request for the TPC parameter C for simultaneous transmission to the eNB 200. In step S507, the eNB 200 that receives the transmission request for the TPC parameter C for simultaneous transmission transmits the TPC parameter C for simultaneous transmission, to the UE 100-1. In step S508, the UE 100-1 that receives the TPC parameter C stores the TPC parameter C.

(Summary of Third Embodiment)

In the operation pattern 1 according to the third embodiment, after receiving the first TPC parameter (TPC parameters A, B), the UE 100-1 receives the second TPC parameter (TPC parameter C). After storing the first TPC parameter, the UE 100-1 stores the second TPC parameter without discarding the first TPC parameter. Thus, it is possible to use the first TPC parameter together with the second TPC parameter.

In an operation pattern 2 according to the third embodiment, the UE 100-1 transmits, to the eNB 200, the capability information indicating a capability related to the simultaneous transmission and/or the D2D communication (or the dual connectivity). The UE 100-1 receives the second TPC parameter (TPC parameter C) transmitted from the eNB 200 in accordance with the capability information. Thus, it is possible to set the second TPC parameter to an appropriate UE 100.

In an operation pattern 3 according to the third embodiment, the UE 100-1 transmits, to the eNB 200, a transmission request for the second TPC parameter (TPC parameter C). The UE 100-1 receives the second TPC parameter transmitted from the eNB 200 in response to the transmission request. Thus, it is possible to set the second TPC parameter to an appropriate UE 100.

Fourth Embodiment

In a fourth embodiment, description proceeds with a particular focus on a difference from the first embodiment to the third embodiment. The fourth embodiment is similar in system configuration to the first embodiment, and similar in operation environment to the second embodiment.

(Operation According to Fourth Embodiment)

As described in the second embodiment, in the dual connectivity, the UE 100 receives scheduling from a different eNB 200. In this case, when the UE 100 applies the TPC parameter C to thereby lower or raise the transmission power of the radio signal SG1 or the radio signal SG2, a reception side is not capable of grasping such a change in transmission power, and an unexpected error thus may occur. Thus, in the fourth embodiment, an operation for preventing such an unexpected error will be described.

(1) Operation Pattern 1

Figure 14:
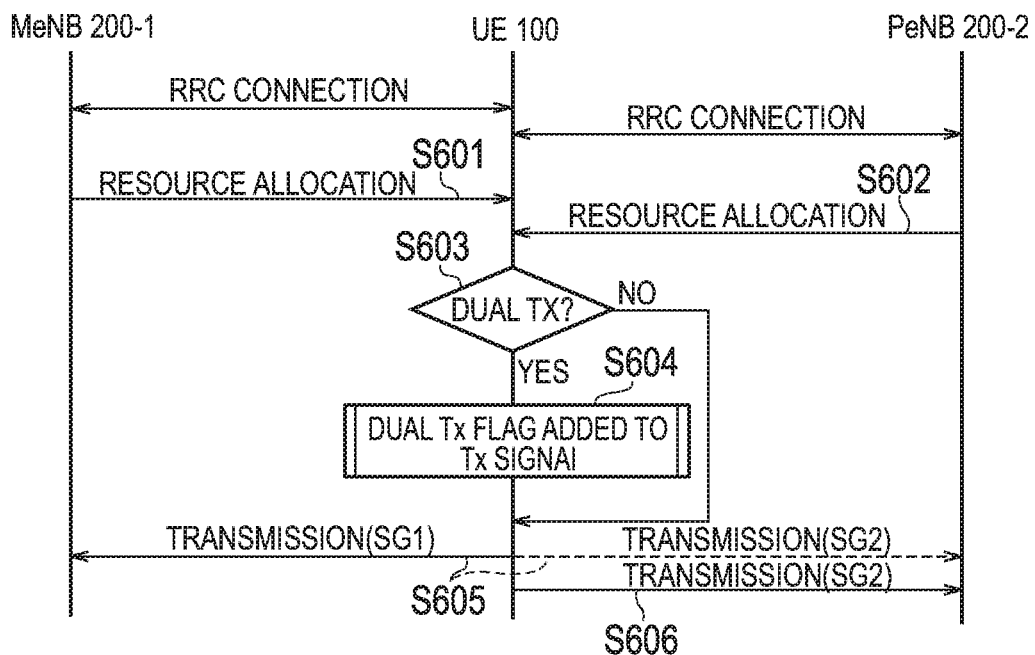
FIG. 14 is a sequence diagram of an operation pattern 1 according to the fourth embodiment.

FIG. 14 is a sequence diagram of an operation pattern 1 according to the fourth embodiment. The UE 100 establishes a connection with each of the MeNB 200-1 and the PeNB 200-2.

As shown in FIG. 14, in step S601, the MeNB 200-1 determines a cellular radio communication resource 1 assigned to the UE 100, and notifies the UE 100 of the determined cellular radio resource 1.

In step S602, the PeNB 200-2 determines a cellular radio resource 2 assigned to the UE 100, and notifies the UE 100 of the determined cellular radio resource 2.

In step S603, the UE 100 determines on the basis of the notified cellular radio resource 1 and cellular radio resource 2 whether or not the simultaneous transmission in which the radio signal SG1 for the MeNB 200-1 and the radio signal SG2 for the PeNB 200-2 are simultaneously transmitted occurs.

When determining that the simultaneous transmission occurs (step S603: YES), in step S604, the UE 100 includes information indicating that the TPC parameter C for simultaneous transmission is applied or is started to be applied (simultaneous transmission flag), into the radio signal (transmission signal) SG1 and the radio signal (transmission signal) SG2. Then, in step S605, the UE 100-1 applies the TPC parameter A and/or TPC parameter B, and the TPC parameter C, determines the transmission power of each of the radio signal SG1 and the radio signal SG2, and simultaneously transmits the radio signal SG1 and the radio signal SG2 with the determined transmission power.

On the other hand, when determining that the simultaneous transmission does not occur (that is, the single transmission is performed) (step S603: NO), the UE 100 does not apply the TPC parameter C but applies the TPC parameters A and B to determine the transmission power of each of the radio signal SG1 and the radio signal SG2. Then, in (a solid arrow) of step S605 and S606, the UE 100 singly transmits each of the radio signal SG1 and the radio signal SG2 with the determined transmission power. It is noted that the UE 100 may include the information indicating that the TPC parameter for single transmission (TPC parameters A, B) is applied (single transmission flag), into each of the radio signal SG1 and the radio signal SG2.

The UE 100 may include the simultaneous transmission flag into the radio signal (transmission signal) SG1 and the radio signal (transmission signal) SG2 during each simultaneous transmission. In this case, the simultaneous transmission flag is information indicating that the TPC parameter C for simultaneous transmission is applied.

Alternatively, when starting applying the TPC parameter C for simultaneous transmission, the UE 100 may include the simultaneous transmission flag into the radio signal (transmission signal) SG1 and the radio signal (transmission signal) SG2. In this case, the simultaneous transmission flag is information indicating starting applying the TPC parameter C for simultaneous transmission. Further, when cancelling applying the TPC parameter C for simultaneous transmission, the UE 100 may include a simultaneous transmission cancelation flag into the radio signal (transmission signal) SG1 and the radio signal (transmission signal) SG2. The simultaneous transmission cancelation flag is information indicating cancelation of applying the TPC parameter C for simultaneous transmission or information indicating applying the TPC parameter for single transmission (TPC parameters A, B).

(2) Operation Pattern 2

Figure 15:
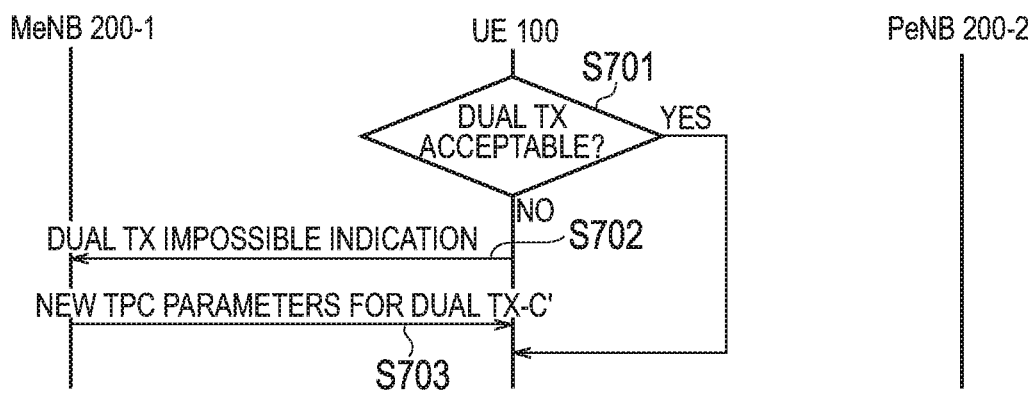
FIG. 15 is a sequence diagram of an operation pattern 2 according to the fourth embodiment.

FIG. 15 is a sequence diagram of an operation pattern 2 according to the fourth embodiment.

As shown in FIG. 15, in step S701, the UE 100 determines whether or not the simultaneous transmission (or the dual connectivity communication) is possible when it is assumed that the TPC parameter C for simultaneous transmission is applied. The determination is performed on the basis of a performance of the UE 100 (performance of the radio transceiver 110), and a difference in transmission power or a frequency interval between the radio signals SG1 and SG2, for example.

When determining that the simultaneous transmission (or the dual connectivity communication) is not possible even when the TPC parameter C for simultaneous transmission is applied (step S701: NO), in step S702, the UE 100 transmits, to the MeNB 200-1, information indicating that the simultaneous transmission (or the dual connectivity communication) is not possible. It is possible to regard the information, as a request to set a new TPC parameter C, a request to cancel the dual connectivity, or a transmission unavailable notification. The transmission unavailable notification is a warning notification indicating that the transmission is not performed even when the resource assignment (Uplink Grant) is performed.

The MeNB 200-1 that receives the information indicating that the simultaneous transmission (or the dual connectivity communication) is not possible transmits, in step S703, a new TPC parameter C, to the UE 100. For example, the new TPC parameter C is set so that a degree by which to reduce the difference in transmission power between the radio signals SG1 and SG2 increases, as compared to the original TPC parameter C.

(3) Operation Pattern 3

Figure 16:
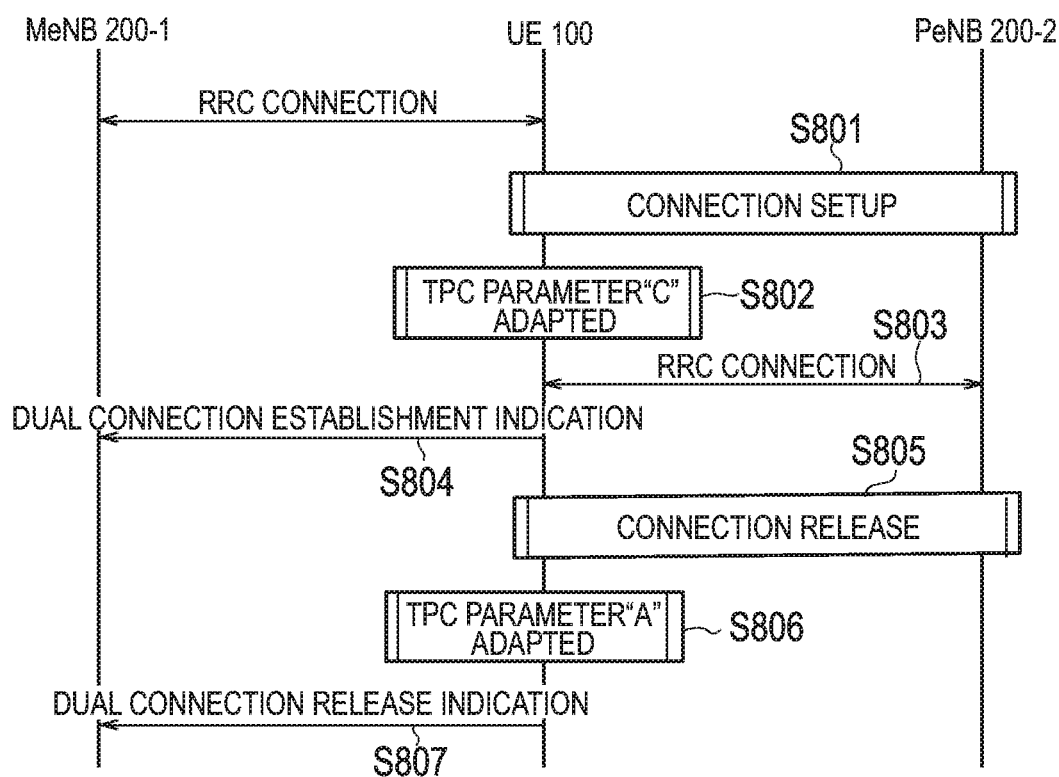
FIG. 16 is a sequence diagram of an operation pattern 3 according to the fourth embodiment.

FIG. 16 is a sequence diagram of an operation pattern 3 according to the fourth embodiment.

As shown in FIG. 16, in step S801, the UE 100 that establishes a connection with the MeNB 200-1 further starts a procedure to establish a connection with the PeNB 200-2 (that is, a procedure of starting the dual connectivity).

In step S802, the UE 100 starts applying the TPC parameter C in accordance with the start of the dual connectivity. In step S803, the UE 100 establishes the connection with the PeNB 200-2.

Thus, in the operation pattern 3 according to the fourth embodiment, when performing communication in the dual connectivity (specific communication mode), the UE 100 always applies the TPC parameter C irrespective of the simultaneous transmission actually occurring.

In step S804, the UE 100 transmits, to the MeNB 200-1, information indicating starting the dual connectivity (dual connectivity establishment notification).

After this, in step S805, the UE 100 releases the connection with the PeNB 200-2, and ends the dual connectivity. It is noted that the UE 100 maintains the connection with the MeNB 200-1.

In step S806, the UE 100 ends applying the TPC parameter C, and starts applying the TPC parameter A.

In step S807, the UE 100 transmits, to the MeNB 200-1, information indicating releasing the dual connectivity (dual connectivity release notification).

It is noted that the dual connectivity establishment notification and the dual connectivity release notification according to the operation pattern 3 based on the fourth embodiment may be transmitted from the PeNB 200-2 to the MeNB 200-1 as well as may be transmitted from the UE 100 to the MeNB 200-1. In this case, the dual connectivity establishment notification and the dual connectivity release notification preferably include an identifier assigned to the UE 100. Alternatively, between the EPC 20 and the eNB 200, the dual connectivity establishment notification and the dual connectivity release notification may be exchanged. Alternatively, the UE 100 that performs the both D2D communication and dual connection may transmit the dual connectivity establishment notification and the dual connectivity release notification to a communication partner of the D2D communication.

(Summary of Fourth Embodiment)

In the operation pattern 1 according to the fourth embodiment, when applying a second transmission power control parameter (TPC parameter C), the UE 100 transmits to the MeNB 200-1 and the PeNB 200-2 information indicating applying or starting applying the second transmission power control parameter. Further, in the operation pattern 1 according to the fourth embodiment, when cancelling applying the second transmission power control parameter, the UE 100 transmits to the MeNB 200-1 and the PeNB 200-2 information indicating cancelling applying the second transmission power control parameter or applying a first transmission power control parameter (TPC parameters A, B). Thus, it is possible to prevent an unexpected error from occurring.

In the operation pattern 2 according to the fourth embodiment, when determining that the simultaneous transmission (or the dual connection) is not possible even when the second TPC parameter is applied, the UE 100 transmits, to the MeNB 200-1, information indicating that the simultaneous transmission (or the dual connection) is not possible. Thus, the MeNB 200-1 is capable of using a new TPC parameter C to deal with the UE 100, etc.

In the operation pattern 3 according to the fourth embodiment, the UE 100 transmits, to the MeNB 200-1, information indicating starting the dual connection when starting the dual connection. Further, the UE 100 transmits, to the MeNB 200-1, information indicating ending the dual connection when ending the dual connection. Thus, it is possible to prevent an unexpected error from occurring.

Other Embodiments

Figure 17:
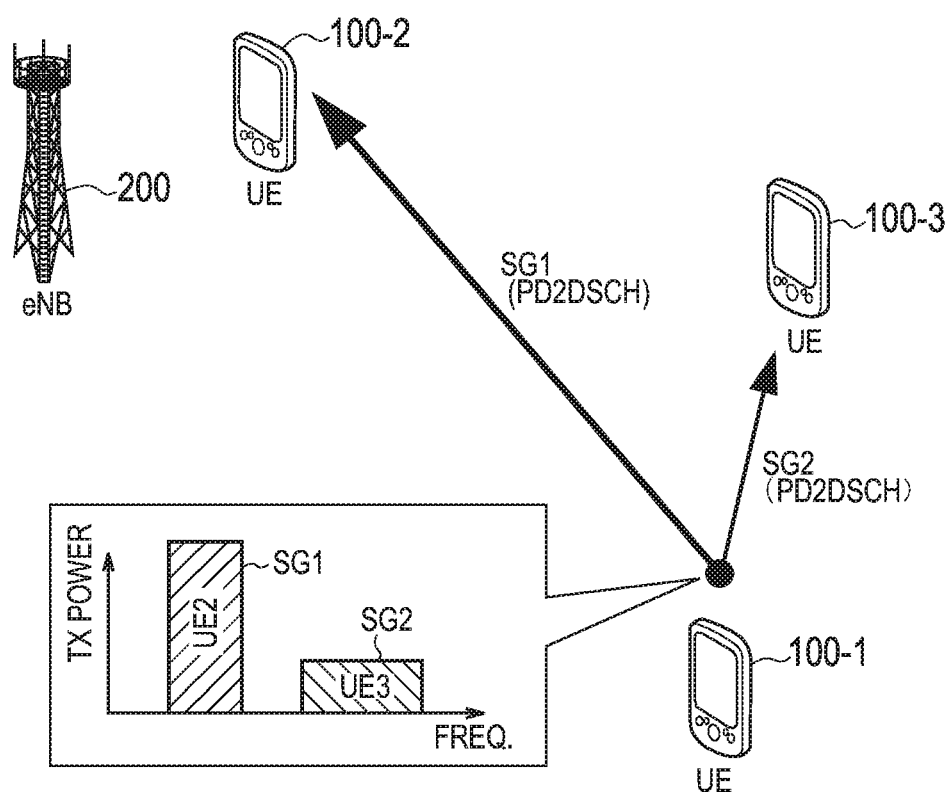
FIG. 17 is a diagram for describing an operation environment according to another embodiment.

In the above-described first embodiment, the UE 100-1 simultaneously transmits the radio signal SG1 in the cellular communication and the radio signal SG2 in the D2D communication. However, the UE 100-1 may simultaneously transmit the radio signal SG1 in the D2D communication and the radio signal SG2 in the D2D communication. FIG. 17 is a diagram for describing an operation environment according to another embodiment. As shown in FIG. 17, in a cell of the eNB 200, the UE 100-1 to a UE 100-3 exist. The UE 100-1 performs the D2D communication with the UE 100-2 and the UE 100-3 under the control of the eNB 200 (communication control apparatus). The UE 100-1 transmits the radio signal SG1 in the D2D communication to the UE 100-2 and transmits the radio signal SG2 in the D2D communication to the UE 100-3. The radio signal SG1 and the radio signal SG2 differ in frequency. In the operation environment shown in FIG. 17, the UE 100-2 is located far from the UE 100-1. The UE 100-3 is located near the UE 100-1. Thus, the UE 100-1 transmits the radio signal SG1 with high transmission power and transmits the radio signal SG2 with low transmission power. The operation according to each of the above-described embodiments may be applied to such an operation environment.

In each of the above-described embodiments, as one example of the cellular communication system, the LTE system is described; however, the present disclosure is not limited to the LTE system, and the present disclosure may be applied to systems other than the LTE system.

INDUSTRIAL APPLICABILITY

According to the present disclosure, it is possible to enable realization of a normal signal transmission even when a simultaneous transmission is performed.

The invention claimed is:

1. A user equipment comprising:
a processor and a memory coupled to the processor, wherein
the processor is configured to:
receive, from a first base station, transmission power control information used for a dual simultaneous transmission in which the user equipment simultaneously transmits a first radio signal to the first base station and a second radio signal to a second base station, the first radio signal being different from the second radio signal,
determine a first transmission power and a second transmission power for the dual simultaneous transmission based on the transmission power control information, wherein
the first transmission power is used for transmitting the first radio signal to the first base station,
the second transmission power is used for transmitting the second radio signal to the second base station, and
the first transmission power is different from the second transmission power.

2. A first base station comprising:
a processor and a memory coupled to the processor, wherein
the processor is configured to
transmit, to a user equipment, transmission power control information used for a dual simultaneous transmission in which the user equipment simultaneously transmits a first radio signal to the first base station and a second radio signal to a second base station, the first radio signal being different from the second radio signal,
the transmission power control information is used by the user equipment to determine a first transmission power and a second transmission power for the dual simultaneous transmission,
the first transmission power is used for transmitting the first radio signal to the first base station,
the second transmission power is used for transmitting the second radio signal to the second base station, and
the first transmission power is different from the second transmission power.

3. A method used for a user equipment, the method comprising:
receiving, from a first base station, transmission power control information used for a dual simultaneous transmission in which the user equipment simultaneously transmits a first radio signal to the first base station and a second radio signal to a second base station, the first radio signal being different from the second radio signal, and
determining, a first transmission power and a second transmission power for the dual simultaneous transmission based on the transmission power control information, wherein
the first transmission power is used for transmitting the first radio signal to the first base station,
the second transmission power is used for transmitting the second radio signal to the second base station, and
the first transmission power is different from the second transmission power.

* * * * *